United States Patent
Li et al.

(10) Patent No.: US 9,959,407 B1
(45) Date of Patent: May 1, 2018

(54) SYSTEMS AND METHODS FOR IDENTIFYING POTENTIALLY MALICIOUS SINGLETON FILES

(71) Applicant: Symantec Corporation, Mountain View, CA (US)

(72) Inventors: Bo Li, Nashville, TN (US); Kevin Alejandro Roundy, El Segundo, CA (US); Christopher Gates, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 141 days.

(21) Appl. No.: 15/071,049

(22) Filed: Mar. 15, 2016

(51) Int. Cl.
*G06F 21/56* (2013.01)
*G06N 99/00* (2010.01)

(52) U.S. Cl.
CPC ........... *G06F 21/56* (2013.01); *G06N 99/005* (2013.01)

(58) Field of Classification Search
CPC .. G06F 21/56; G06N 99/0025; H04L 63/1433
See application file for complete search history.

(56) References Cited

U.S. PATENT DOCUMENTS

| | | | |
|---|---|---|---|
| 5,519,865 A | 5/1996 | Kondo et al. | |
| 8,402,545 B1 | 3/2013 | Chen et al. | |
| 8,769,685 B1 * | 7/2014 | Conrad | G06F 21/562 726/23 |
| 2006/0037080 A1 | 2/2006 | Maloof | |
| 2009/0013405 A1 * | 1/2009 | Schipka | G06F 21/562 726/22 |
| 2013/0305368 A1 | 11/2013 | Ford | |
| 2014/0090061 A1 * | 3/2014 | Avasarala | G06F 21/56 726/24 |
| 2015/0007319 A1 * | 1/2015 | Antonov | G06F 21/56 726/23 |

(Continued)

OTHER PUBLICATIONS

Bo Li, et al; Systems and Methods for Identifying Suspicious Singleton Files Using Correlational Predictors; U.S. Appl. No. 14/966,502, filed Dec. 11, 2015.

(Continued)

*Primary Examiner* — Robert B Leung
(74) *Attorney, Agent, or Firm* — FisherBroyles, LLP

(57) ABSTRACT

A computer-implemented method for identifying potentially malicious singleton files may include (1) identifying a set of benign singleton files and a set of malicious singleton files, (2) obtaining, for each singleton file in the sets of benign and malicious singleton files, file identification information that identifies the singleton file, (3) using the file identification information of the singleton files from the sets of benign and malicious singleton files to train a classifier to classify unknown singleton files, (4) detecting an unclassified singleton file, (5) analyzing, with the trained classifier, information that identifies the unclassified singleton file, (6) determining, based on the analysis of the information that identifies the unclassified singleton file, that the unclassified singleton file is suspicious, and (7) triggering a security action in response to determining that the unclassified singleton file is suspicious. Various other methods, systems, and computer-readable media are also disclosed.

20 Claims, 6 Drawing Sheets

(56) References Cited

U.S. PATENT DOCUMENTS

2015/0172303 A1    6/2015   Humble et al.

OTHER PUBLICATIONS

Sutskever, Ilya et al., "Generating Text with Recurrent Neural Networks", http://www.cs.utoronto.ca/~ilya/pubs/2011/LANG-RNN.pdf, as accessed Feb. 10, 2016, Proceedings of the 28th International Conference on Machine Learning, Bellevue, WA, (2011).

* cited by examiner

SYSTEMS AND METHODS FOR IDENTIFYING POTENTIALLY MALICIOUS SINGLETON FILES

BACKGROUND

Malicious files may contain harmful content, such as malware, than can damage a computing system. Traditionally, security software may detect these malicious files using known data about similar files or through identifying unusual files. For example, a security system may maintain a database of information on malware files and compare files on a computing device against the database to detect possible known malware. Security software may also detect unusual files with unknown attributes on the computing device and flag them as potential malware.

However, many files on computing devices may have unique attributes that cannot be compared with known files. For example, singleton files are the only ones of their kind that are detected in a computing system or organization. Sometimes, security software that may collect information on files across multiple computing systems may collect very little information on singleton files due to privacy issues. Furthermore, it may be costly to collect more detailed information on a vast number of singleton files. Thus, in some cases, malicious files with unique attributes or the first occurrence of a malware file may not be easily identified without information to compare the attributes to known malware. Additionally, benign files with unknown attributes may be wrongly flagged as malware. In many cases, a majority of singleton files may not be accurately identified when the file attributes are too unique for traditional security systems to handle. Accordingly, the instant disclosure identifies and addresses a need for additional and improved systems and methods for identifying potentially malicious singleton files.

SUMMARY

As will be described in greater detail below, the instant disclosure generally relates to systems and methods for identifying potentially malicious singleton files by classifying files as malicious or benign. For example, the disclosed systems may filter known malicious and benign singleton files to extract features that may be used to train a classifier. By determining common features and causes of benign singleton files, such as through evaluation of filenames and paths, these systems may improve the classifier to more easily recognize benign singleton files. Furthermore, by classifying an unknown singleton file with the resulting classifier, these systems may prevent malicious files from harming a computing device.

In one example, a computer-implemented method for identifying potentially malicious singleton files may include (1) identifying a set of benign singleton files and a set of malicious singleton files, (2) obtaining, for each singleton file in the sets of benign and malicious singleton files, file identification information that identifies the singleton file, (3) using the file identification information of the singleton files from the sets of benign and malicious singleton files to train a classifier to classify unknown singleton files, (4) detecting an unclassified singleton file, (5) analyzing, with the trained classifier, information that identifies the unclassified singleton file, (6) determining, based on the analysis of the information that identifies the unclassified singleton file, that the unclassified singleton file is suspicious, and (7) triggering a security action in response to determining that the unclassified singleton file is suspicious.

In some embodiments, identifying the sets of benign and malicious singleton files may include filtering representative samples of benign singleton files to obtain a comparable set size of benign singleton files to malicious singleton files. Alternatively, identifying the sets of benign and malicious singleton files may include filtering the representative samples of benign singleton files to obtain a smaller set size of benign singleton files than malicious singleton files. In these embodiments, the representative samples of benign singleton files may include calculated centroid values of clusters of benign singleton files. Furthermore, the singleton file within the sets of benign and malicious singleton files may include a file different from any other file stored within a computing devices.

In some examples, the file identification information that identifies the singleton file may include a filename, an inverse of the filename, a file path, a size of the file, a file header, and/or a file entropy. Additionally or alternatively, the file identification information may include an external library that the singleton file uses, a function imported by the singleton file, and/or a computing device on which the singleton file resides.

In one embodiment, using the file identification information to train the classifier may include deriving features from the file identification information. Additionally, using the file identification information to train the classifier may include using a machine learning model to classify the features derived from the file identification information.

In one example, analyzing the information that identifies the unclassified singleton file may include converting the information that identifies the unclassified singleton file into at least one feature. Analyzing the information may also include using the trained classifier to classify the unclassified singleton file based on the feature.

In some embodiments, determining that the unclassified singleton file is suspicious may include determining that the unclassified singleton file is classified as malicious using the trained classifier. Additionally or alternatively, determining that the unclassified singleton file is suspicious may include determining that the information that identifies the unclassified singleton file is similar to a malicious singleton file in the set of malicious singleton files.

In some examples, the security action may include triggering an alert that the unclassified singleton file is suspicious, confirming that the unclassified singleton file is malicious, and/or removing the unclassified singleton file from a computing device on which the unclassified singleton file resides. These embodiments may further include adding the unclassified singleton file to the set of malicious singleton files in response to confirming that the unclassified singleton file is malicious.

In one embodiment, a system for implementing the above-described method may include (1) an identification module, stored in memory, that identifies a set of benign singleton files and a set of malicious singleton files, (2) an obtainment module, stored in memory, that obtains, for each singleton file in the sets of benign and malicious singleton files, file identification information that identifies the singleton file, (3) a classification module, stored in memory, that uses the file identification information of the singleton files from the sets of benign and malicious singleton files to train a classifier to classify unknown singleton files, (4) a detection module, stored in memory, that detects an unclassified singleton file, (5) an analysis module, stored in memory, that analyzes, with the trained classifier, information that identifies the unclassified singleton file, (6) a determination module, stored in memory, that determines, based on the analysis of the information that identifies the unclassified singleton file, that the unclassified singleton file is suspicious, and (7) a security module, stored in memory, that triggers a security action in response to determining that the unclassified singleton file is suspicious. In addition, the system may include at least one processor that executes the identification module, the obtainment module, the classification module, the detection module, the analysis module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a set of benign singleton files and a set of malicious singleton files, (2) obtain, for each singleton file in the sets of benign and malicious singleton files, file identification information that identifies the singleton file, (3) use the file identification information of the singleton files from the sets of benign and malicious singleton files to train a classifier to classify unknown singleton files, (4) detect an unclassified singleton file, (5) analyze, with the trained classifier, information that identifies the unclassified singleton file, (6) determine, based on the analysis of the information that identifies the unclassified singleton file, that the unclassified singleton file is suspicious, and (7) trigger a security action in response to determining that the unclassified singleton file is suspicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
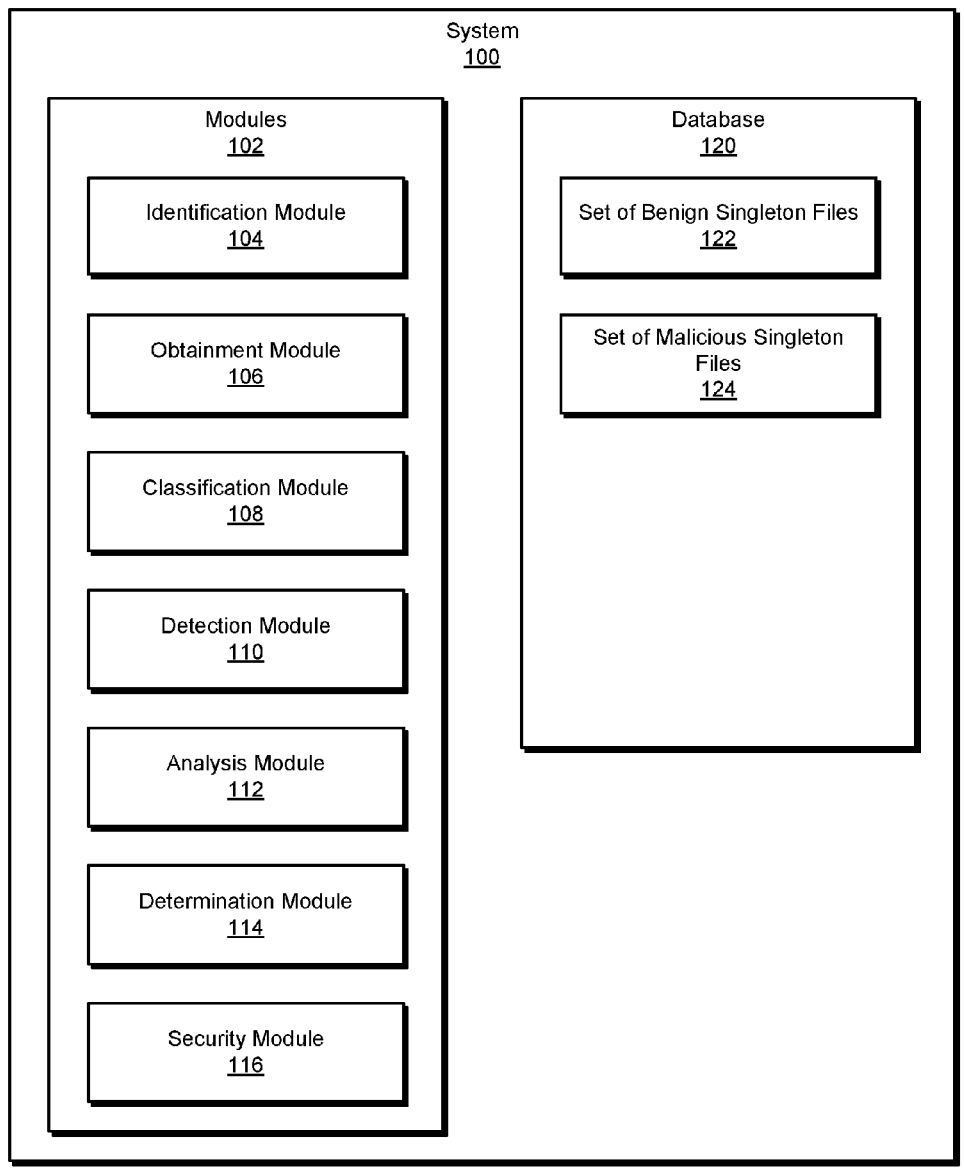
FIG. 1 is a block diagram of an exemplary system for identifying potentially malicious singleton files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying potentially malicious singleton files. As will be explained in greater detail below, by filtering a typically larger set of benign singleton files, the systems and methods disclosed herein may ensure balanced samples of both benign and malicious singleton files to train a classifier. For example, by taking centroid values from clusters of benign singleton files, the disclosed systems and methods may select representative values of benign singleton files. The disclosed systems and methods may then use the trained classifier to further classify unknown files and detect malicious singleton files given a potentially limited amount of information about the files.

Figure 2:
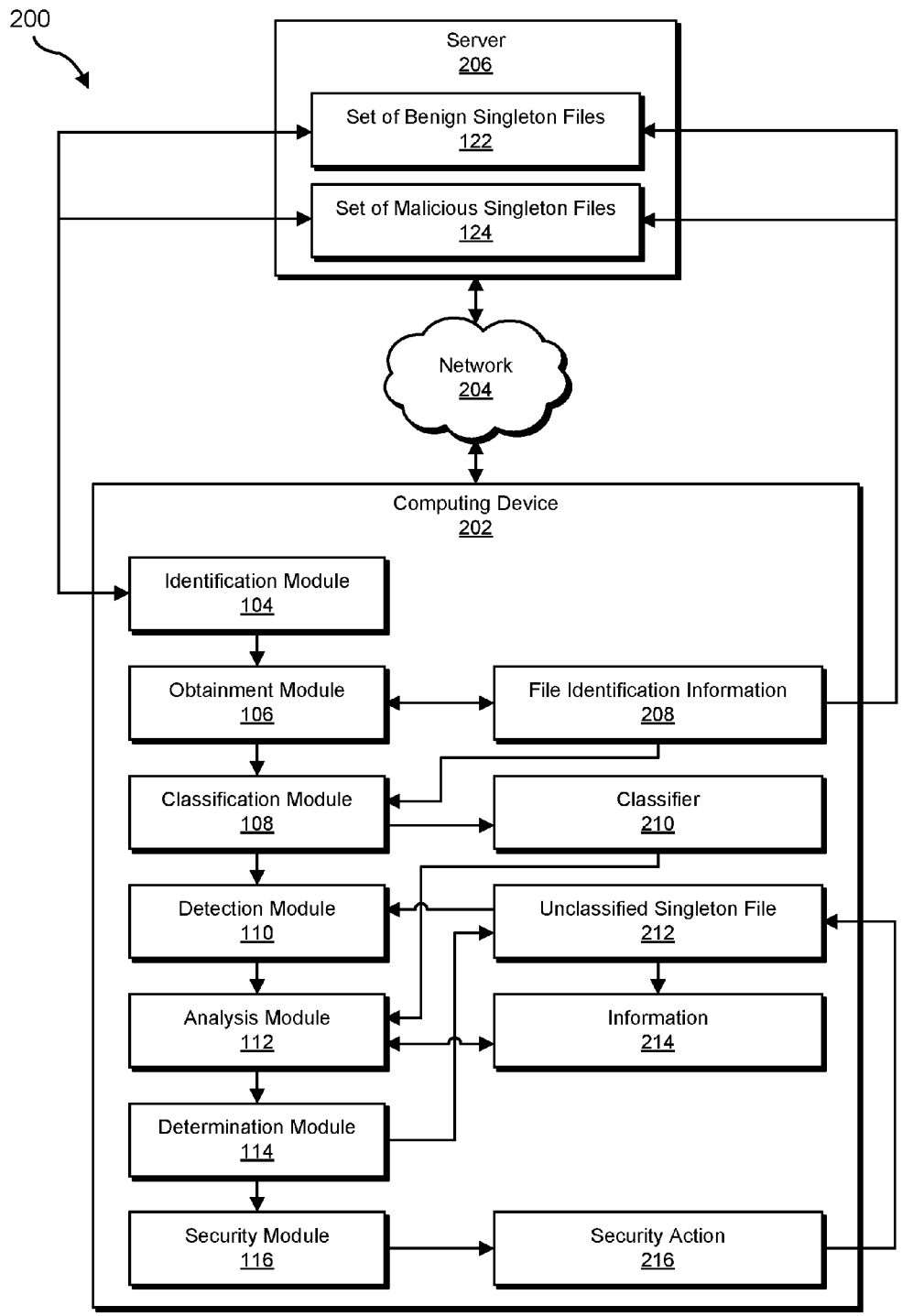
FIG. 2 is a block diagram of an additional exemplary system for identifying potentially malicious singleton files.

The following will provide, with reference to FIGS. 1 and 2, detailed descriptions of exemplary systems for identifying potentially malicious singleton files. Detailed descriptions of corresponding computer-implemented methods will also be provided in connection with FIG. 3. In addition, detailed descriptions of an exemplary creation and usage of an exemplary classifier will be provided in connection with FIG. 4. Furthermore, detailed descriptions of an exemplary computing system and network architecture capable of implementing one or more of the embodiments described herein will be provided in connection with FIGS. 5 and 6, respectively.

FIG. 1 is a block diagram of exemplary system 100 for identifying potentially malicious singleton files. As illustrated in this figure, exemplary system 100 may include one or more modules 102 for performing one or more tasks. For example, and as will be explained in greater detail below, exemplary system 100 may include an identification module 104 that may identify a set of benign singleton files and a set of malicious singleton files. The term "singleton file," as used herein, generally refers to a file with unique attributes that make it the only one of its kind within a given set of files.

Exemplary system 100 may also include an obtainment module 106 that may obtain, for each singleton file in the sets of benign and malicious singleton files, file identification information that identifies the singleton file. Exemplary system 100 may additionally include a classification module 108 that may use the file identification information of the singleton files from the sets of benign and malicious singleton files to train a classifier to classify unknown singleton files. The term "classifier," as used herein, generally refers to a mathematical function or algorithm that may utilize patterns in data to categorize observations.

Exemplary system 100 may further include a detection module 110 that may detect an unclassified singleton file. Exemplary system 100 may also include an analysis module 112 that may analyze, with the trained classifier, information that identifies the unclassified singleton file. Exemplary system 100 may then include a determination module 114 that may determine, based on the analysis of the information that identifies the unclassified singleton file, that the unclassified singleton file may be suspicious. Finally, exemplary system 100 may include a security module 116 that may trigger a security action in response to determining that the unclassified singleton file may be suspicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a set of benign singleton files 122 and/or a set of malicious singleton files 124. Set of benign singleton files 122 and set of malicious singleton files 124 may contain information about singleton files pre-classified as benign or malicious, respectively.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both sever 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to classify unknown singleton files as benign or malicious. For example, and as will be described in greater detail below, identification module 104 may identify set of benign singleton files 122 and set of malicious singleton files 124. Obtainment module 106 may obtain, for each singleton file in the sets of benign and malicious singleton files 122 and 124, file identification information 208 that identifies the singleton file. Classification module 108 may then use file identification information 208 of the singleton files from the sets of benign and malicious singleton files 122 and 124 to train a classifier 210 to classify unknown singleton files. Furthermore, detection module 110 may detect an unclassified singleton file 212. Analysis module 112 may then analyze, with trained classifier 210, information 214 that identifies unclassified singleton file 212. Determination module 114 may determine, based on the analysis of information 214, that unclassified singleton file 212 is suspicious. Finally, security module 116 may trigger a security action 216 in response to determining that unclassified singleton file 212 is suspicious.

In the example of FIG. 2, and as will be explained in greater detail below, computing device 202 may first detect sets of benign and malicious singleton files 122 and 124 on server 206 via network 204. Computing device 202 may then extract file identification information 208 from sets of benign and malicious singleton files 122 and 124 and use file identification information 208 to train classifier 210. Computing device 202 may then detect unclassified singleton file 212 and extract information 214 about unclassified singleton file 212. Using information 214 as input into classifier 210, computing device 202 may classify unclassified singleton file 212 as malicious and determine it is suspicious. Computing device 202 may subsequently perform security action 216 to mitigate the malicious effects of unclassified singleton file 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of storing and/or managing information about sets of singleton files. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
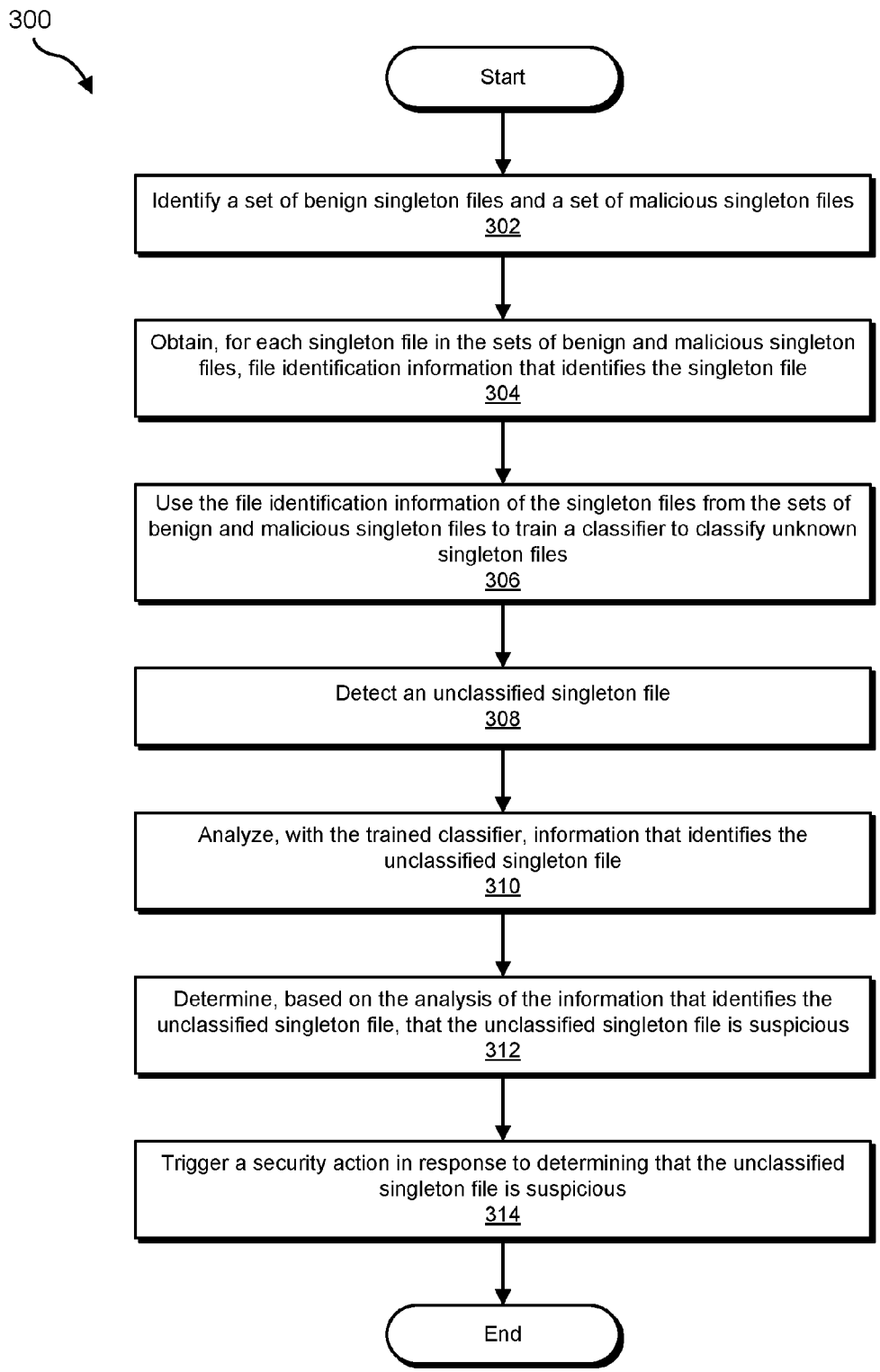
FIG. 3 is a flow diagram of an exemplary method for identifying potentially malicious singleton files.

FIG. 3 is a flow diagram of an exemplary computer-implemented method 300 for identifying potentially malicious singleton files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may identify a set of benign singleton files and a set of malicious singleton files. For example, identification module 104 may, as part of computing device 202 in FIG. 2, identify set of benign singleton files 122 and set of malicious singleton files 124.

Identification module 104 may identify sets of benign and malicious singleton files 122 and 124 in a variety of ways. In some examples, identification module 104 may identify sets of benign and malicious singleton files 122 and 124 by filtering representative samples of benign singleton files to obtain a comparable set size of benign singleton files to malicious singleton files. In other examples, identification module 104 may filter the representative samples of benign singleton files to obtain a smaller set size of benign singleton files than malicious singleton files. By filtering a typically larger dataset of benign singleton files, identification module 104 may ensure a more balanced training dataset with more importance placed on malicious singleton files.

In one embodiment, the representative samples of benign singleton files may include calculated centroid values of clusters of benign singleton files. In this embodiment, benign singleton files may first be clustered based on information about the files, such as file identification information 208. As used herein, the term "clustering" generally refers to a method of grouping similar data to distinguish it from less similar data. Examples of clustering may include, without limitation, k-nearest neighbors (k-NN) algorithms, k-means clustering, expectation-maximization algorithms, hierarchical clustering, or any other suitable method. Similarity of files may be tested using standard statistical metrics (e.g. Jaccard index) in order to find clusters that are most similar. Examples of clustering of benign singleton files are discussed in U.S. application Ser. No. 14/996,502, titled SYSTEMS AND METHODS FOR IDENTIFYING SUSPICIOUS SINGLETON FILES USING CORRELATIONAL PREDICTORS, and filed on 11 Dec. 2015, the disclosure of which is incorporated in full in the present application.

In other embodiments, identification module 104 may first profile a singleton file to determine, based on detecting software or another source of the singleton file, that the singleton file is benign. Identification module 104 may then cluster identified benign singleton files using known static properties about the files, such as file identification information 208. In these embodiments, singleton files created by specific software may include similar properties, such as file naming conventions, that may improve filtering of benign singleton files from malicious singleton files. Furthermore, text chunking using natural signifiers such as letter cases (i.e. upper or lower case) may be used in conjunction with text processing methods like bag-of-words models to classify textual data, including filenames and/or file paths, for better clustering results. As used herein, the term "text chunking" generally refers to a method of breaking down a sequence of text characters into segments for data processing.

Returning to FIG. 3, at step 304, one or more of the systems described herein may obtain, for each singleton file in the sets of benign and malicious singleton files, file identification information that identifies the singleton file. For example, obtainment module 106 may, as part of computing device 202 in FIG. 2, obtain, for each singleton file in sets of benign and malicious singleton files 122 and 124, file identification information 208 that identifies the singleton file.

Obtainment module 106 may obtain file identification information 208 in a variety of ways. In one example, the singleton file within sets of benign and malicious singleton files 122 and 124 may include a file different from any other file stored within a plurality of computing devices. In this example, sets of benign and malicious singleton files 122 and 124 may include singleton files from a single computing device, a plurality of computing devices in an organization, a plurality of computing devices using a security software, or any other predetermined set of computing devices. In the example of FIG. 2, information about singleton files from the plurality of computing devices may be stored in a central database, such as database 120 on server 206. Obtainment module 106 may then obtain file identification information 208 for each singleton file for which it has access.

In some embodiments, file identification information 208 that identifies each singleton file may include a filename and/or file extension. As another example, file identification information 208 may include an inverse of the filename and/or file extension. In these embodiments, the inverse of the filename may enable similar file extensions to be lined up during clustering and/or classification analyses for better results. Additionally or alternatively, file identification information 208 may include a file path, a size of the file, a file header, a calculated file entropy, an external library that the singleton file uses, and/or a computing device on which the singleton file resides. For example, file identification information 208 may include an address and/or details about the security status of the computing device on which the singleton file resides.

Although various types and families of malware may contain similar features and attributes of malware files within that particular type of malware, in this example, some families of malware may have a high degree of variability of files within the family. For example, malware within a family may have multiple versions of the same malware or varying file sizes. However, these highly variable malware files may exhibit other behaviors that are similar. For example, malware may attack computing systems that already contain a large variety of files of different sizes for different functions. External functions utilized by a singleton file may be static and provide additional insight into behaviors of singleton files that are malicious or benign. Attempts to disguise externally linked functions may indicate the singleton file is potentially malware, thus causing malware to become detectable. Therefore, file identification information 208 may include external functions, such as imported application programming interface functions and/or functions imported from external libraries, that may determine how the singleton file behaves. Examples of these functions may include functions to prevent analysis of malware, unpack malware, access external code, propagate malicious code, or for other similar purposes.

In the above embodiments, file identification information 208 may include a limited amount of information for singleton files, such as only the filename, the path of the file, and the size of the file. By chunking textual data, as previously described, simple file identification information 208, such as filenames and paths, may provide adequate data to create a classifier. However, malware creators may attempt to evade detection by, for example, naming malicious files similarly to benign singleton files. Thus, obtainment module 106 may collect information about additional static properties, when available, to improve classification of singleton files.

Returning to FIG. 3, at step 306, one or more of the systems described herein may use the file identification information of the singleton files from the sets of benign and malicious singleton files to train a classifier to classify unknown singleton files. For example, classification module 108 may, as part of computing device 202 in FIG. 2, use file identification information 208 of the singleton files from sets of benign and malicious singleton files 122 and 124 to train classifier 210 to classify unknown singleton files.

Classification module 108 may train classifier 210 in a variety of ways. In some examples, classification module 108 may use file identification information 208 to train classifier 210 by deriving features from file identification information 208 and using a machine learning model to classify the features derived from file identification information 208. The term "feature," as used herein, generally refers to a value or vector derived from data that can be analyzed as part of machine learning. The term "machine learning," as used herein, generally refers to a computational algorithm that may learn from data in order to make predictions. Examples of machine learning may include, without limitation, support vector machines, recurrent neural networks, clustering, decision trees, or any other suitable supervised, semi-supervised, or unsupervised methods.

Figure 4:
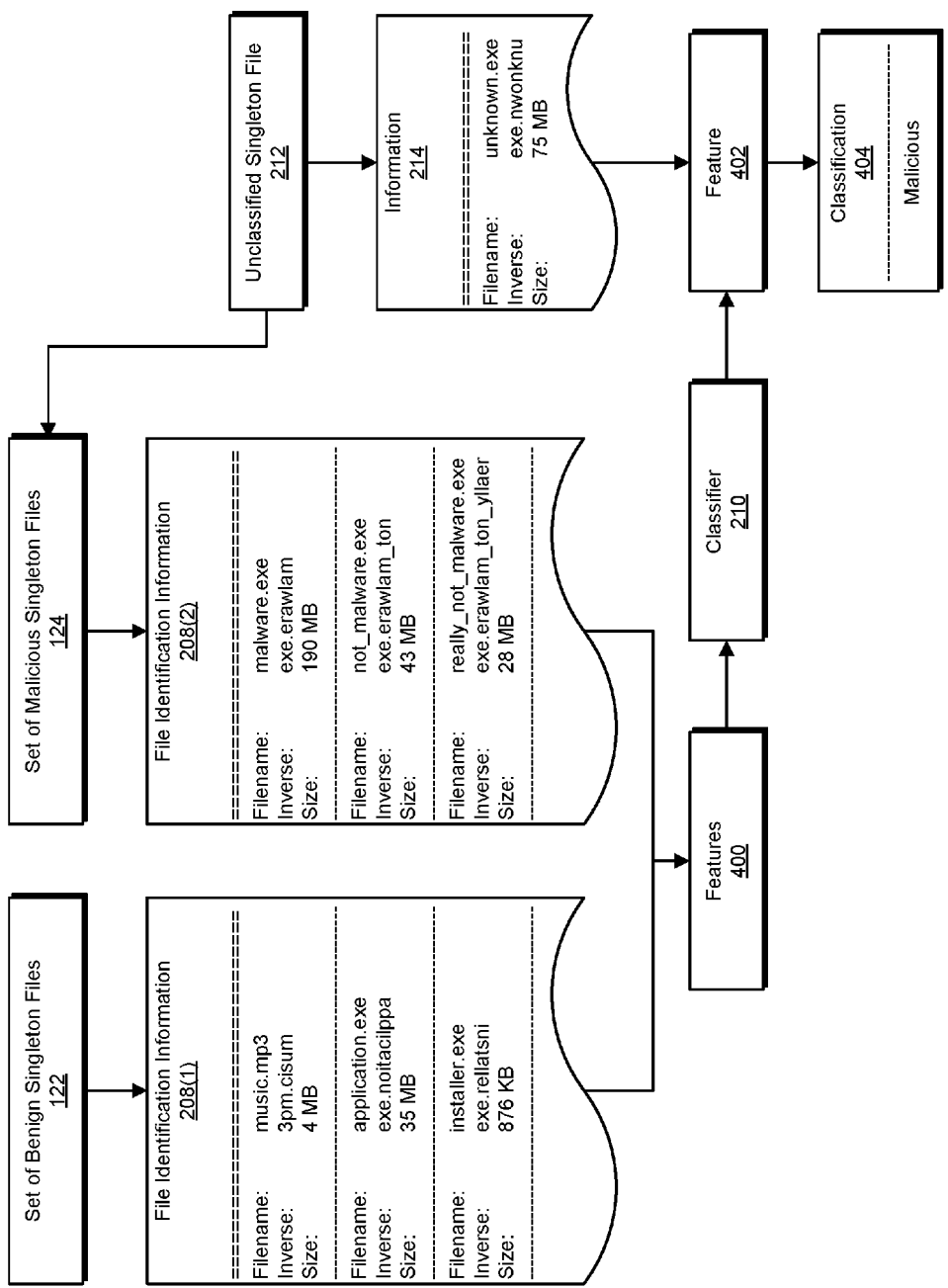
FIG. 4 is a block diagram of an exemplary creation and usage of an exemplary classifier.

For example, as shown in FIG. 4, one or more of the systems described herein, such as obtainment module 106, may first obtain file identification information 208(1) and file identification information 208(2) from set of benign singleton files 122 and set of malicious singleton files 124, respectively. File identification information 208(1) and 208(2) may include filenames, inverse filenames, and sizes for each file within the sets. Then, classification module 108 may extract features 400 from file identification information 208(1) and 208(2) and use features 400 to train classifier 210. For example, recurrent neural networks may be used to learn patterns in file identification information 208(1) and 208(2) when the information mostly includes textual data, such as in FIG. 4.

Alternatively, when file identification information 208(1) and 208(2) include additional non-textual static properties, other methods such as support vector machines may be used to better classify the information with machine learning. Although classification module 108 may train classifier 210 using textual data, additional static properties may be further useful in cases when malware is intentionally manipulated to evade detection with this type of classification. Thus, classifier 210 may be improved with a variety of file identification information 208.

Furthermore, through the process of training classifier 210, classification module 108 may exclude features that are less useful for classification and leave only discriminative features that distinguish between malicious and benign files in classifier 210. By extracting features and using them to train classifier 210, classification module 108 may allow classification of a singleton file without needing a holistic view of all singleton files. For example, classifier 210 may be sent to multiple client machines to locally classify files instead of profiling files by access through network 204.

Returning to FIG. 3, at step 308, one or more of the systems described herein may detect an unclassified singleton file. For example, detection module 110 may, as part of computing device 202 in FIG. 2, detect unclassified singleton file 212.

Detection module 110 may detect unclassified singleton file 212 in a variety of ways. In one embodiment, unclassified singleton file 212 may reside on computing device 202. In other embodiments, detection module 110 may detect unclassified singleton file 212 on server 206 or another computing device via network 204. Detection module 110 may further detect unclassified singleton file 212 by comparing files to determine that unclassified singleton file 212 is unlike any other file within a known set of files and that unclassified singleton file 212 is not in sets of benign and malicious singleton files 122 and 124.

Returning to FIG. 3, at step 310, one or more of the systems described herein may analyze, with the trained classifier, information that identifies the unclassified singleton file. For example, analysis module 112 may, as part of computing device 202 in FIG. 2, analyze, with trained classifier 210, information 214 that identifies unclassified singleton file 212.

Analysis module 112 may analyze information 214 in a variety of ways. In some embodiments, analysis module 112 may analyze information 214 by converting information 214 into at least one feature and using classifier 210 to classify unclassified singleton file 212 based on the feature. In the example of FIG. 4, analysis module 112 may identify information 214 including filename, inverse filename, and size of unclassified singleton file 212. Analysis module 112 may then extract feature 402 from information 214 and classify unclassified singleton file 212 based on feature 402. In this example, analysis module 112 may determine a classification 404 that states unclassified singleton file 212 is malicious.

Returning to FIG. 3, at step 312, one or more of the systems described herein may determine, based on the analysis of the information that identifies the unclassified singleton file, that the unclassified singleton file is suspicious. For example, determination module 114 may, as part of computing device 202 in FIG. 2, determine, based on the analysis of information 214, that unclassified singleton file 212 is suspicious.

Determination module 114 may determine that unclassified singleton file 212 is suspicious in a variety of ways. In one embodiment, determination module 114 may determine that unclassified singleton file 212 is suspicious by determining that unclassified singleton file 212 is classified as malicious using classifier 210. In the example of FIG. 4, determination module 114 may use classification 404 to determine that unclassified singleton file 212 is suspicious. In other embodiments, determination module 114 may determine that information 214 is similar to information about a malicious singleton file in set of malicious singleton files 124. In these embodiments, determination module 114 may directly compare information 214 to information about set of malicious singleton files 124, such as file identification information 208(2) in FIG. 4.

Returning to FIG. 3, at step 314, one or more of the systems described herein may trigger a security action in response to determining that the unclassified singleton file is suspicious. For example, security module 116 may, as part of computing device 202 in FIG. 2, trigger security action 216 in response to determining that unclassified singleton file 212 is suspicious.

Security module 116 may trigger security action 216 in a variety of ways. In one example, security action 216 may include triggering an alert that unclassified singleton file 212 is suspicious. In another example, security action 216 may include confirming that unclassified singleton file 212 is malicious. In this example, security module 116 may notify an administrator and/or security software to review information about unclassified singleton file 212 and make a determination confirming the classification, such as classification 404. Additionally or alternatively, security action 216 may include removing unclassified singleton file 212 from a computing device on which unclassified singleton file 212 resides. In the example of FIG. 2, security action 216 may remove unclassified singleton file 212 from computing device 202.

In some embodiments, one or more of the systems described herein may further include adding unclassified singleton file 212 to set of malicious singleton files 124 in response to confirming that unclassified singleton file 212 is malicious. In these embodiments, the systems described herein may improve classifier 210 by updating sets of benign and malicious singleton files 122 and 124 and retraining classifier 210 with the updated data.

As explained above in connection with method 300 in FIG. 3, the disclosed systems and methods may, by using file identification information, train a classifier to identify potentially malicious singleton files. Specifically, the disclosed systems and methods may first identify separate sets of benign and malicious singleton files. For example, the systems and methods described herein may use k-NN methods to create clusters of benign singleton files and, subsequently, use the centroids of the clusters as training data on benign files. Similarly, the systems and methods described herein may use cases of potentially malicious singleton files as training data on malicious files. By filtering benign files to create a balance of both types of training data, the disclosed systems and methods may train a classifier that overcomes a skew toward more benign singleton files.

The disclosed systems and methods may further identify a singleton file that has not been classified. In the above example, the systems and methods described herein may use file identification information about the unclassified singleton file, such as the inverse of the filename, to determine a classification with the trained classifier. Furthermore, the disclosed systems and methods may perform security actions to handle a potentially malicious singleton file to prevent malware damage. Finally, the disclosed systems and methods may continually improve the trained classifier by adding information about an identified malicious singleton file to the training data used for the classifier.

As detailed above, by utilizing the limited file identification information available about singleton files, the disclosed systems and methods may train a classifier that identifies potentially malicious singleton files without a need for extensive, detailed information. When additional detailed information is available, the disclosed systems and methods may further improve the classifier with the detailed information to overcome intentional attempts by malware creators to evade detection. In addition, by clustering similar benign singleton files, the disclosed systems and methods may create training data that is representative of a large set of singleton files. Thus, the systems and methods described herein may allow computer systems to more accurately classify malicious and benign files when the files are unique.

Figure 5:
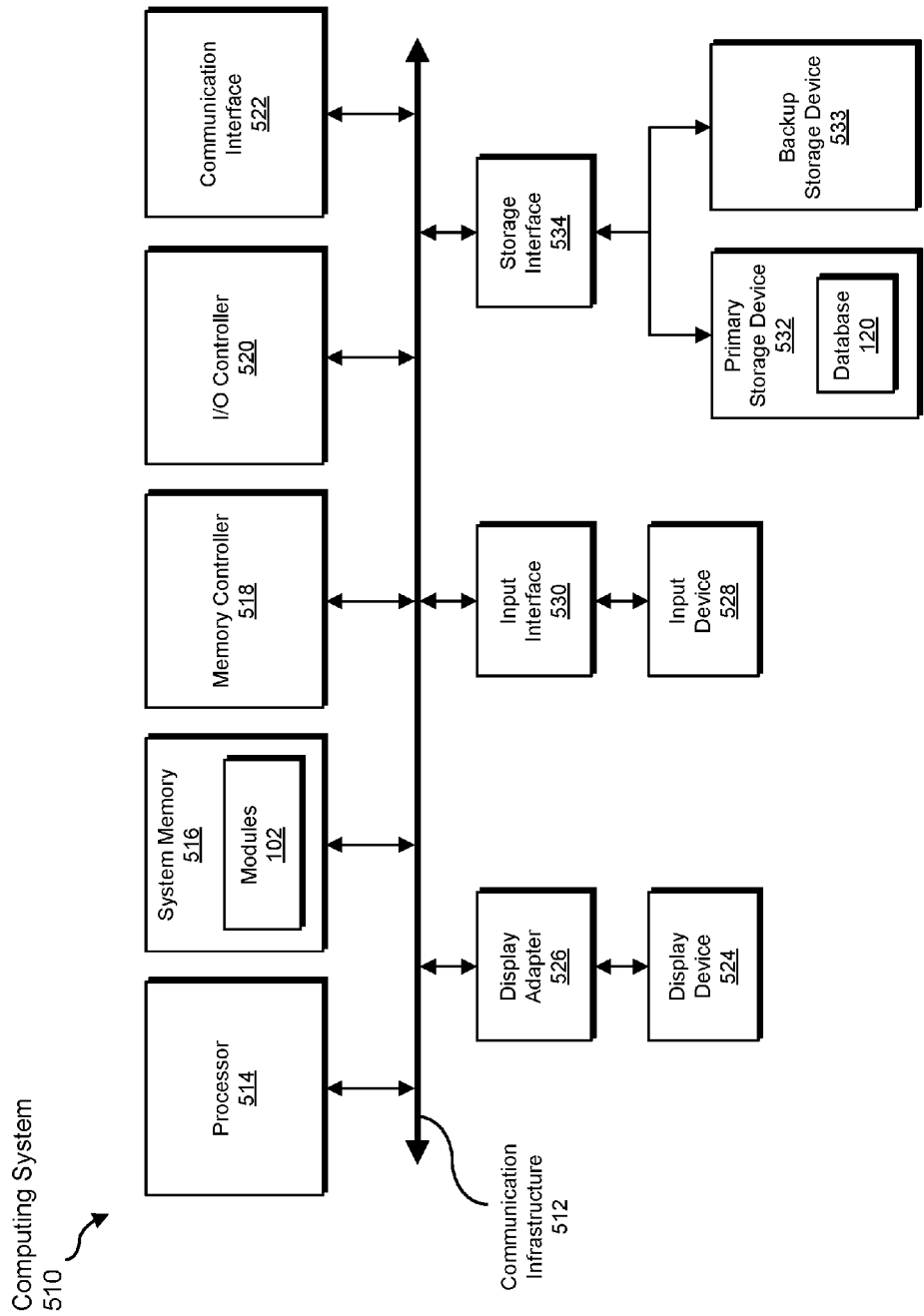
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
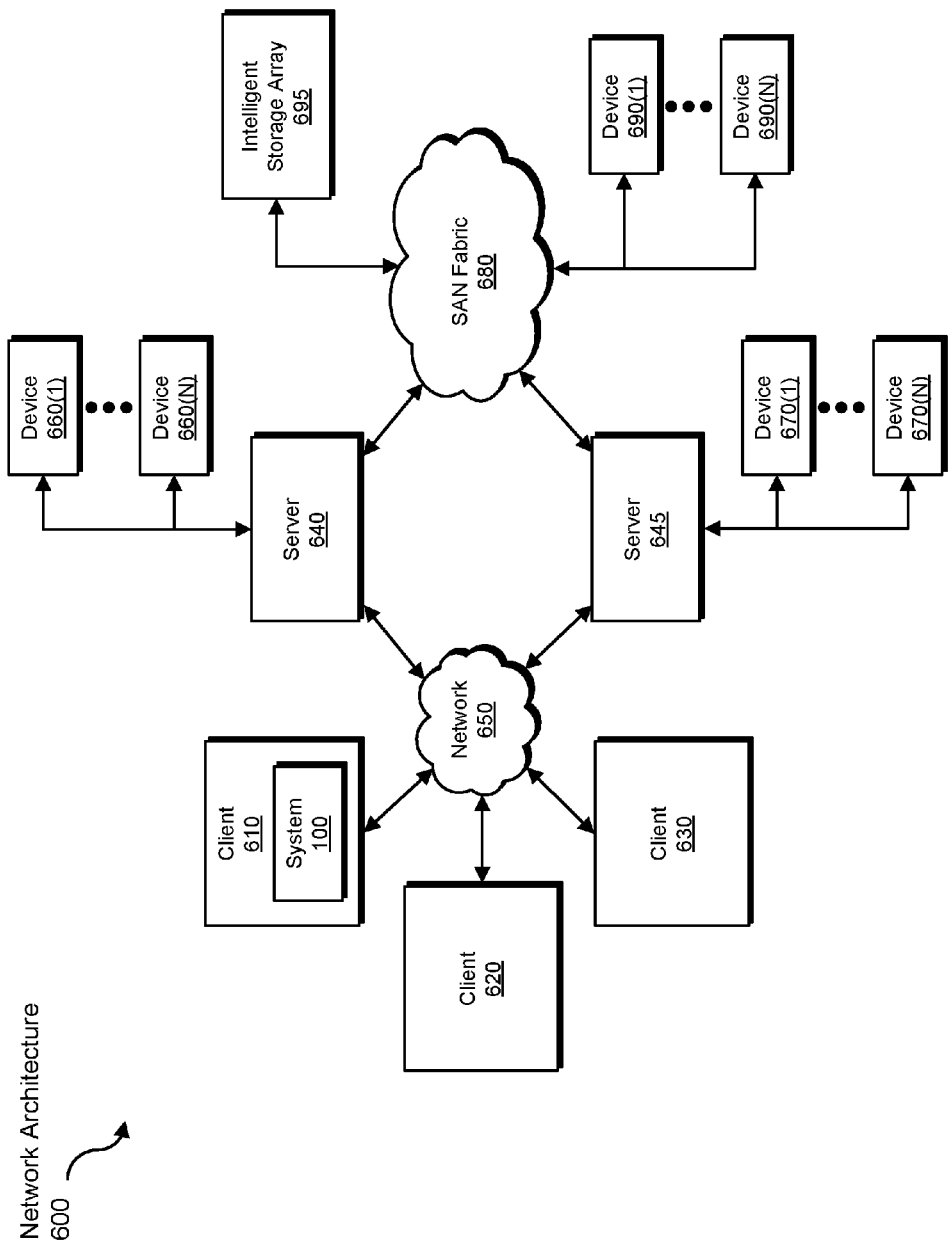
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for identifying potentially malicious singleton files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive file identification information about singleton files to be transformed, transform the file identification information, output a result of the transformation to a storage or output device, use the result of the transformation to create a classifier for singleton files, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying potentially malicious singleton files, at least a portion of the method being performed by a computing device comprising at least one processor, the method comprising:
   identifying a set of benign singleton files and a set of malicious singleton files;
   obtaining, for each singleton file in the sets of benign and malicious singleton files, file identification information that identifies the singleton file;
   using the file identification information of the singleton files from the sets of benign and malicious singleton files to train a classifier to classify unknown singleton files;
   detecting an unclassified singleton file;
   analyzing, with the trained classifier, information that identifies the unclassified singleton file;
   determining, based on the analysis of the information that identifies the unclassified singleton file, that the unclassified singleton file is suspicious;
   triggering a security action in response to determining that the unclassified singleton file is suspicious.

2. The method of claim 1, wherein identifying the sets of benign and malicious singleton files comprises at least one of:
   filtering representative samples of benign singleton files to obtain a comparable set size of benign singleton files to malicious singleton files;
   filtering the representative samples of benign singleton files to obtain a smaller set size of benign singleton files than malicious singleton files.

3. The method of claim 2, wherein the representative samples of benign singleton files comprise calculated centroid values of clusters of benign singleton files.

4. The method of claim 1, wherein the singleton file within the sets of benign and malicious singleton files comprises a file different from any other file stored within a plurality of computing devices.

5. The method of claim 1, wherein the file identification information that identifies the singleton file comprises at least one of:
   a filename;
   an inverse of the filename;

a file path;
a size of the file;
a file header;
a file entropy;
an external library that the singleton file uses;
a function imported by the singleton file;
a computing device on which the singleton file resides.

6. The method of claim 1, wherein using the file identification information to train the classifier comprises:
deriving features from the file identification information;
using a machine learning model to classify the features derived from the file identification information.

7. The method of claim 1, wherein analyzing the information that identifies the unclassified singleton file comprises:
converting the information that identifies the unclassified singleton file into at least one feature;
using the trained classifier to classify the unclassified singleton file based on the feature.

8. The method of claim 1, wherein determining that the unclassified singleton file is suspicious comprises at least one of:
determining that the unclassified singleton file is classified as malicious using the trained classifier;
determining that the information that identifies the unclassified singleton file is similar to a malicious singleton file in the set of malicious singleton files.

9. The method of claim 1, wherein the security action comprises at least one of:
triggering an alert that the unclassified singleton file is suspicious;
confirming that the unclassified singleton file is malicious;
removing the unclassified singleton file from a computing device on which the unclassified singleton file resides.

10. The method of claim 9, further comprising adding the unclassified singleton file to the set of malicious singleton files in response to confirming that the unclassified singleton file is malicious.

11. A system for identifying potentially malicious singleton files, the system comprising:
at least one physical processor; and
a system memory having stored therein one or more computer-executable instructions that, when executed by the at least one physical processor, cause the system to perform the following:
identify a set of benign singleton files and a set of malicious singleton files;
obtain, for each singleton file in the sets of benign and malicious singleton files, file identification information that identifies the singleton file;
use the file identification information of the singleton files from the sets of benign and malicious singleton files to train a classifier to classify unknown singleton files;
detect an unclassified singleton file;
analyze, with the trained classifier, information that identifies the unclassified singleton file;
determine, based on the analysis of the information that identifies the unclassified singleton file, that the unclassified singleton file is suspicious; and
trigger a security action in response to determining that the unclassified singleton file is suspicious.

12. The system of claim 11, wherein the system identifies the sets of benign and malicious singleton files by at least one of:
filtering representative samples of benign singleton files to obtain a comparable set size of benign singleton files to malicious singleton files;
filtering the representative samples of benign singleton files to obtain a smaller set size of benign singleton files than malicious singleton files.

13. The system of claim 12, wherein the representative samples of benign singleton files comprise calculated centroid values of clusters of benign singleton files.

14. The system of claim 11, wherein the singleton file within the sets of benign and malicious singleton files comprises a file different from any other file stored within a plurality of computing devices.

15. The system of claim 11, wherein the file identification information that identifies the singleton file comprises at least one of:
a filename;
an inverse of the filename;
a file path;
a size of the file;
a file header;
a file entropy;
an external library that the singleton file uses;
a function imported by the singleton file;
a computing device on which the singleton file resides.

16. The system of claim 11, wherein the system uses the file identification information to train the classifier by:
deriving features from the file identification information;
using a machine learning model to classify the features derived from the file identification information.

17. The system of claim 11, wherein the system analyzes the information that identifies the unclassified singleton file by:
converting the information that identifies the unclassified singleton file into at least one feature;
using the trained classifier to classify the unclassified singleton file based on the feature.

18. The system of claim 11, wherein the system determines that the unclassified singleton file is suspicious by at least one of:
determining that the unclassified singleton file is classified as malicious using the trained classifier;
determining that the information that identifies the unclassified singleton file is similar to a malicious singleton file in the set of malicious singleton files.

19. The system of claim 11, wherein the security action comprises at least one of:
triggering an alert that the unclassified singleton file is suspicious;
confirming that the unclassified singleton file is malicious;
removing the unclassified singleton file from a computing device on which the unclassified singleton file resides.

20. A non-transitory computer-readable medium comprising one or more computer-executable instructions that, when executed by at least one processor of a computing device, cause the computing device to:
identify a set of benign singleton files and a set of malicious singleton files;
obtain, for each singleton file in the sets of benign and malicious singleton files, file identification information that identifies the singleton file;
use the file identification information of the singleton files from the sets of benign and malicious singleton files to train a classifier to classify unknown singleton files;
detect an unclassified singleton file;

analyze, with the trained classifier, information that identifies the unclassified singleton file;
determine, based on the analysis of the information that identifies the unclassified singleton file, that the unclassified singleton file is suspicious;
trigger a security action in response to determining that the unclassified singleton file is suspicious.

* * * * *